United States Patent
Ronzani et al.

(10) Patent No.: US 6,424,321 B1
(45) Date of Patent: *Jul. 23, 2002

(54) HEAD-MOUNTED MATRIX DISPLAY

(75) Inventors: Peter A. Ronzani, Los Gatos; Jeffrey Jacobsen, Hollister; Stephen Pombo, Sunnyvale; Rodney Bumgardner, Cupertino, all of CA (US)

(73) Assignee: Kopin Corporation, Taunton, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/579,415

(22) Filed: Dec. 27, 1995

Related U.S. Application Data

(63) Continuation of application No. 08/141,133, filed on Oct. 22, 1993, now abandoned.

(51) Int. Cl.[7] .................................................. G09G 5/00
(52) U.S. Cl. ................................. 345/8; 345/7; 345/87; 345/102
(58) Field of Search ................................. 345/8, 7, 4, 5, 345/6, 87, 102, 76, 82, 905, 903; 348/794, 790, 800, 801; 351/158; 349/61, 62, 64

(56) References Cited

U.S. PATENT DOCUMENTS

| | | | |
|---|---|---|---|
| 3,375,375 A | 3/1968 | Abbey et al. | |
| 4,010,322 A | 3/1977 | Nathanson | 358/233 |
| 4,028,725 A | 6/1977 | Lewis | 358/103 |
| 4,034,401 A | 7/1977 | Mann | 358/93 |
| 4,109,145 A | 8/1978 | Graf | 250/201 |
| 4,181,405 A | 1/1980 | Cohen | 350/174 |
| 4,254,451 A * | 3/1981 | Cochran, Jr. | 351/158 |
| 4,287,809 A | 9/1981 | Egli et al. | 89/41 |
| 4,361,384 A | 11/1982 | Bosserman | 350/174 |
| 4,393,380 A * | 7/1983 | Hosokawa et al. | 345/92 |
| 4,636,866 A * | 1/1987 | Hattori | 348/794 |
| 4,695,129 A * | 9/1987 | Faessen et al. | 345/8 |
| 4,704,740 A | 11/1987 | McKee et al. | 455/348 |
| 4,737,972 A | 4/1988 | Schoolman | 378/41 |
| 4,782,340 A * | 11/1988 | Czubatyj et al. | 345/205 |
| 4,814,876 A | 3/1989 | Horio et al. | 358/160 |
| 4,837,817 A | 6/1989 | Maemori | 358/224 |
| 4,856,088 A | 8/1989 | Oliwa et al. | 455/349 |
| 4,928,300 A | 5/1990 | Ogawa et al. | 379/53 |
| 4,934,773 A | 6/1990 | Becker | 350/6.6 |
| 4,945,350 A * | 7/1990 | Kawamuza et al. | 345/102 |
| 4,952,024 A | 8/1990 | Gale | 350/143 |

(List continued on next page.)

FOREIGN PATENT DOCUMENTS

| | | |
|---|---|---|
| CA | 2123461 | 11/1994 |
| DE | 27 15 446 | 10/1978 |
| EP | 0 344 881 | 12/1989 |

(List continued on next page.)

OTHER PUBLICATIONS

"Hand-held Videophone," *Popular Science* (1992, Feb.).
"VideoPhone price cut to $1,000," *USA Today*.
"SA620 Integrated Front-End," *Philips Electronics North America Corp.* (1993).
Katz "Low Cost Helment Mounted Display and Eye Tracking Concepts" *MaK Technologies, Inc.* Presentation, May 15, 1991.

*Primary Examiner*—Xiao Wu
(74) *Attorney, Agent, or Firm*—Hamilton, Brook, Smith & Reynolds, P.C.

(57) ABSTRACT

A compact, light weight head mounted display in which a pair of matrix display elements are mounted within a housing. The display utilizes a pair of arms or stems that are rotatable mounted to the housing such that the user can pivot each arm from a folded position into an open position. The arms can be spring mounted onto the housing to secure the display to the user's head and can also incorporate earphones that can be retracted into each arm when not in use.

44 Claims, 7 Drawing Sheets

U.S. PATENT DOCUMENTS

| | | | |
|---|---|---|---|
| 4,977,456 A | | 12/1990 | Furuya .................. 358/213.13 |
| 4,997,263 A | * | 3/1991 | Cohen et al. .................... 345/8 |
| 5,003,300 A | * | 3/1991 | Wells ............................ 345/8 |
| 5,023,931 A | | 6/1991 | Streck et al. ................. 455/21 |
| 5,034,809 A | | 7/1991 | Katoh ........................ 358/88 |
| 5,077,784 A | | 12/1991 | Fujita et al. .................. 379/53 |
| 5,079,627 A | | 1/1992 | Filo ............................ 358/85 |
| 5,093,567 A | | 3/1992 | Staveley ..................... 250/221 |
| 5,106,179 A | | 4/1992 | Kamaya et al. ............. 351/158 |
| 5,111,498 A | | 5/1992 | Guichard et al. ............. 379/53 |
| 5,122,880 A | | 6/1992 | Nagano ...................... 358/209 |
| 5,138,312 A | | 8/1992 | Tsukamoto et al. .... 340/825.44 |
| 5,153,569 A | | 10/1992 | Kawamura et al. ......... 340/705 |
| 5,162,828 A | * | 11/1992 | Furness et al. ............. 351/158 |
| 5,164,833 A | | 11/1992 | Aoki .......................... 358/224 |
| 5,164,980 A | | 11/1992 | Bush et al. .................... 379/53 |
| 5,189,632 A | | 2/1993 | Paajanen et al. ....... 364/705.05 |
| 5,220,366 A | | 6/1993 | King .......................... 354/76 |
| 5,224,198 A | | 6/1993 | Jachimowicz et al. ...... 385/133 |
| 5,281,957 A | * | 1/1994 | Schoolman .................... 345/8 |
| 5,321,416 A | | 6/1994 | Bassett et al. .................. 345/8 |
| 5,323,189 A | * | 6/1994 | Contreras .................... 351/158 |
| 5,381,179 A | | 1/1995 | Kashimura .................. 348/376 |
| 5,416,496 A | * | 5/1995 | Wood .......................... 345/102 |
| 5,440,197 A | | 8/1995 | Gleckman ................... 313/110 |
| 5,485,318 A | | 1/1996 | Lebby et al. ............... 359/811 |
| 5,485,504 A | | 1/1996 | Ohnsorge .................... 379/58 |
| 5,584,070 A | | 12/1996 | Harris et al. ................ 455/346 |
| 5,655,832 A | | 8/1997 | Pelka et al. ................. 362/296 |
| 5,684,354 A | | 11/1997 | Gleckman ................... 313/110 |

FOREIGN PATENT DOCUMENTS

| | | |
|---|---|---|
| EP | 0 352 914 A2 | 1/1990 |
| EP | 0 424 880 A2 | 5/1991 |
| EP | 0 438 362 A1 | 7/1991 |
| EP | 0 454 443 A2 | 10/1991 |
| EP | 0 472 361 A3 | 2/1992 |
| EP | 0 491 639 A1 | 6/1992 |
| EP | 0 526 802 A2 | 2/1993 |
| EP | 0 539 699 A2 | 5/1993 |
| EP | 0 539 907 A3 | 5/1993 |
| EP | 0 547 493 A1 | 6/1993 |
| EP | 0 551 781 A1 | 7/1993 |
| EP | 0 626 773 A1 | 11/1994 |
| FR | 2715446 | 10/1978 |
| FR | 2522804 | 9/1983 |
| FR | 2612351 | 9/1988 |
| GB | 2 206 421 A | 6/1988 |
| JP | 1259580 | 7/1979 |
| JP | 60046019 | 3/1985 |
| JP | 54093378 | 10/1989 |
| JP | 2-113656 | 4/1990 |
| JP | 3-105383 | 5/1991 |
| JP | 6-123852 | 5/1994 |
| JP | 7-235892 | 9/1995 |
| WO | 91/04508 | 4/1991 |
| WO | WO 93/01583 | 1/1993 |
| WO | 93/16550 | 8/1993 |
| WO | 93/18428 | 9/1993 |
| WO | 93/23783 | 11/1993 |
| WO | 94/01958 | 1/1994 |
| WO | 94/18595 | 8/1994 |
| WO | 96/21173 | 7/1996 |
| WO | 96/21205 | 7/1996 |

* cited by examiner

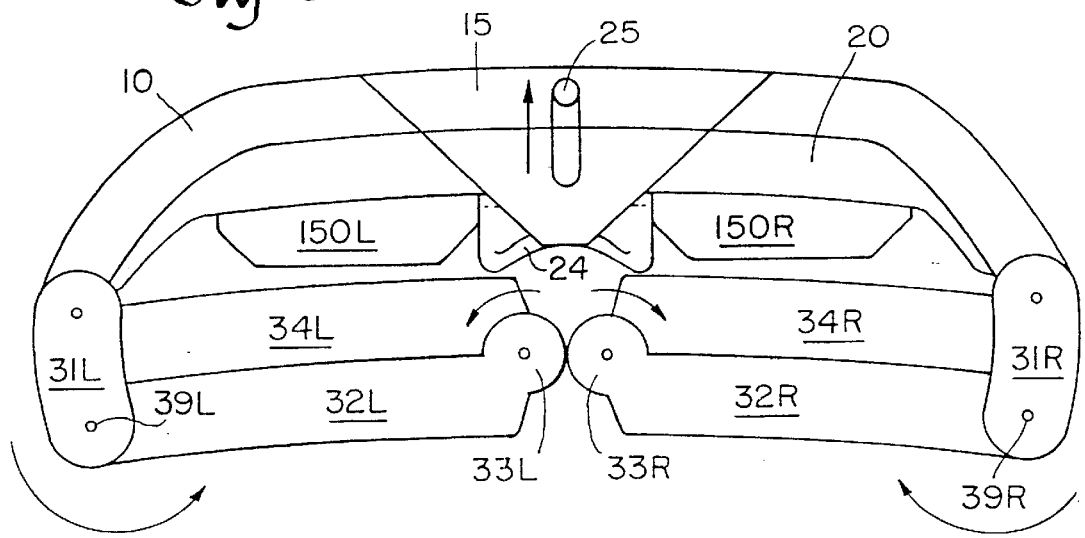
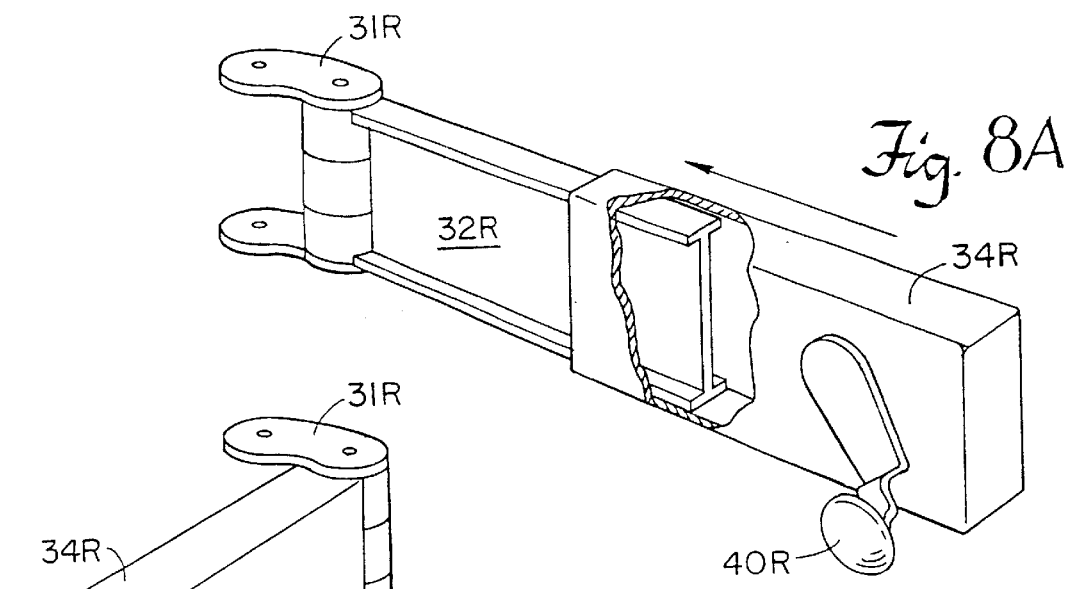

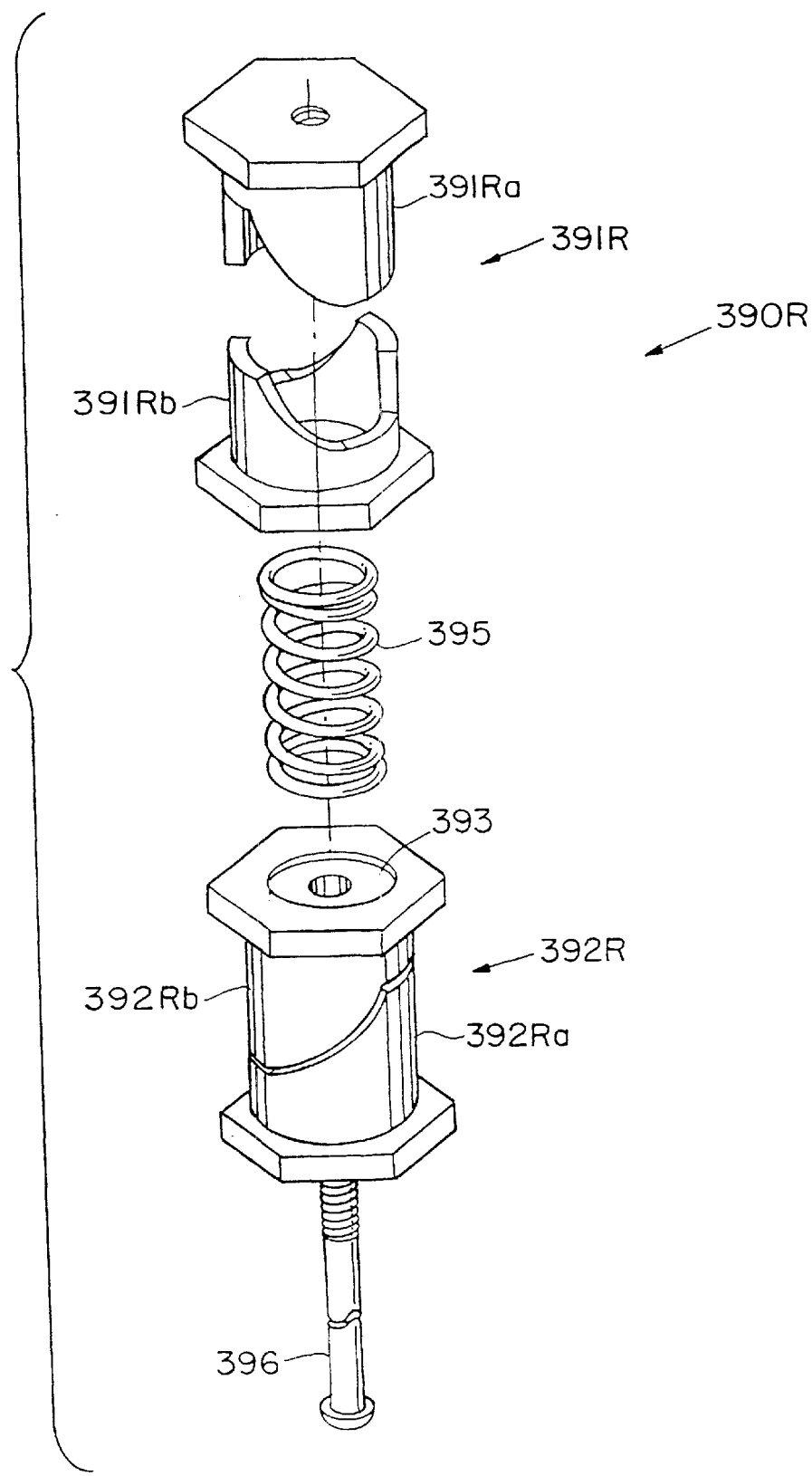

HEAD-MOUNTED MATRIX DISPLAY

This application is a continuation of application Ser. No. 08/141,133 filed on Oct. 22, 1993, now abandoned, which is incorporated herein by reference in its entirety.

BACKGROUND OF THE INVENTION

Head mounted display systems have been developed for a number of different applications including use by aircraft pilots and for simulation such as virtual imaging. Head mounted displays are generally limited by their resolution and by their size and weight.

Existing displays have relatively low resolution, and because of the size and weight of available systems, these displays are positioned at the relatively large distance from the eye. Of particular importance, it is desired to keep the center of gravity of the display from extending upward and forward from the center of gravity of the head and neck of the wearer, where it will place a large torque on the wearer's neck and may bump into other instruments during use.

There is a continuing need to present images to the wearer of a helmet mounted display in high-resolution format similar to that of a computer monitor. The display needs to be as non-intrusive as possible, leading to the need for lightweight and compact system. Existing head mounted displays have used analog cathode ray tube ("CRT") devices mounted above or to the side of the user's head which project an image onto a surface or visor mounted in front of the user's eyes. Often these displays utilize helmets which incorporate earphones into the helmet. Other head mounted display devices have contemplated the use of liquid crystal devices that could be mounted above or to the side of the user's head and employ reflective optics to direct an image within the field of view of the user.

SUMMARY OF THE INVENTION

In accordance with the present invention a head mounted display includes a housing in which a pair of matrix display elements are secured. These display elements are of a sufficiently light-weight and compact nature that the housing can be mounted onto the head of a user with a pair of hinge mounted arms or support elements that can be rotated relative to the housing from a closed position to an open position. When in the open position the arms extend about the opposite side of the user's head and serve to position audio transducers mounted on the arms into proximity with the ears of the user. The arms can also be double hinged in which each arm is folded once about its mid-point and then rotated about the hinge on each side of the housing to assume the closed position. System electronics and manually adjustable controls can be positioned within the housing or the rotating arms. Positioning of the electronics and controls within the arms permits a more desirable distribution of weight evenly about the sides of the user's head.

The inter-pupillary distance between the two displays can be adjusted such as by the use of a gear driven cam assembly mounted within the housing.

The direct view display can be a transmission type display with the light source directly adjacent the light valve active matrix and mounted within the display device. The transmission type display can, in a preferred embodiment, also receive light directly from the user's environment so that the display overlays an image over the users existing field of view.

Alternatively, the display can be an emission type device such as an active matrix electroluminescent display or an active matrix of light emitting diodes (LEDs), or a transmissive passive matrix display.

BRIEF DESCRIPTION OF THE DRAWINGS

The above and other features of the invention, including various novel details of construction and combinations of parts, will now be more particularly described with reference to the accompanying drawings and pointed out in the claims. It will be understood that the particular head mounted display embodying the invention is shown by way of illustration only and not as a limitation of the invention. The principles and features of this invention may be employed in varied and numerous embodiments without departing from the scope of the invention.

FIG. 6 is a top plan view showing the embodiment of FIG. 1 in a stowed position.

FIG. 7 is an exploded perspective view of a preferred embodiment of cam assembly for the pivot point 39 of FIG. 6.

FIGS. 8A–8B are partial perspective views of another preferred embodiment for storing the stems 30 of FIG. 1.

DETAILED DESCRIPTION OF THE PREFERRED EMBODIMENT OF THE INVENTION

Figure 1:
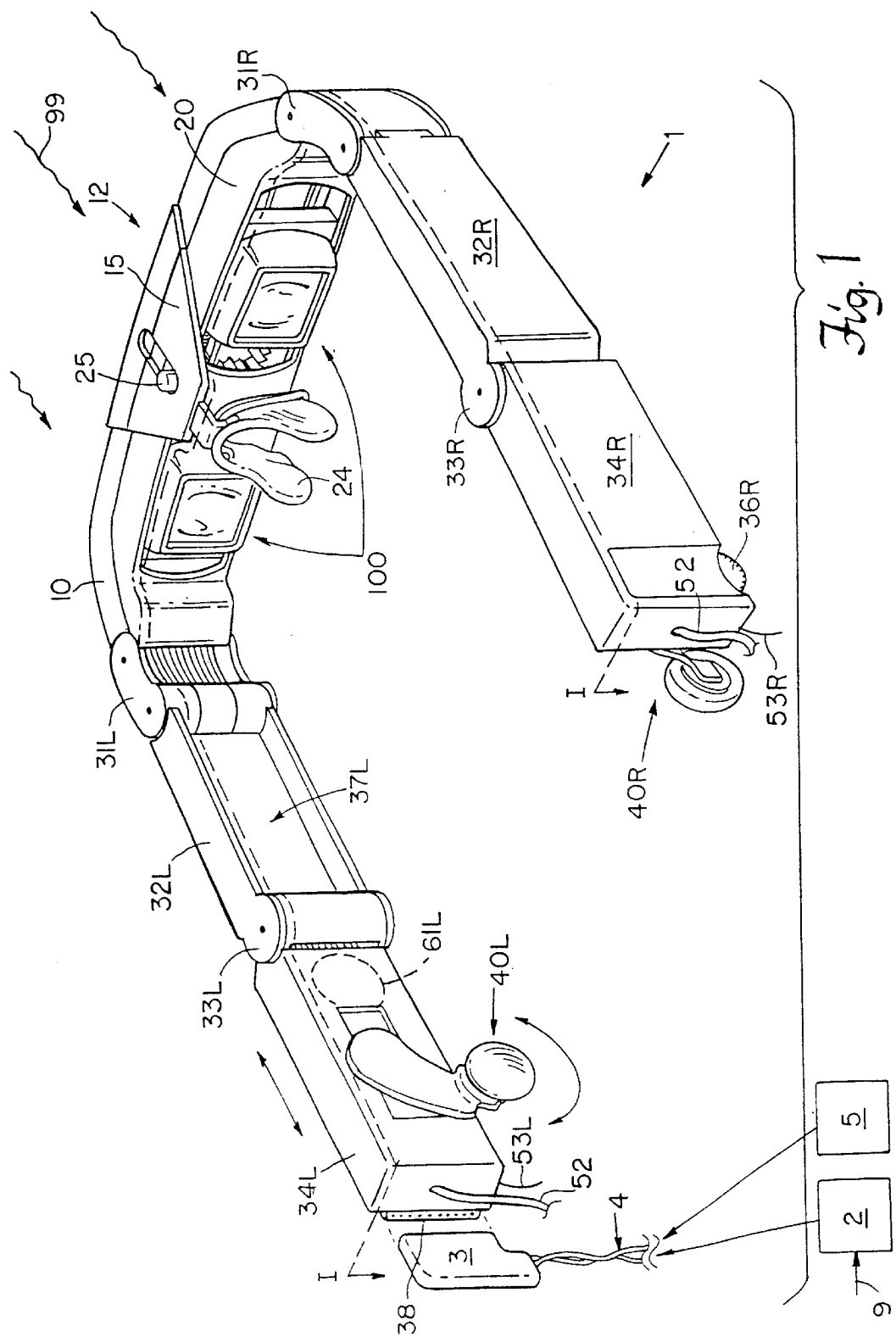
FIG. 1 is a rear perspective view of a preferred embodiment of the invention.

FIG. 1 is a rear perspective view of a preferred embodiment of a head mounted display 1. The head mounted display 1 is constructed of plastic or some other light-weight housing material and is adapted to be worn by a user to view video images via an optical assembly 100. The head mounted display exploits electronic digital imaging to form video images on a pair of light valve display panels, one of which is viewed through the user's left eye and the other of which is viewed through the user's right eye. Related discussions of head mounted display devices are provided in U.S. patent application Ser. No. 07/971,352, filed Nov. 4, 1992 and International Patent Publication WO 93/18428, filed Mar. 12, 1992, the teachings of which are both incorporated herein by reference.

The images are provided by a remote video source 2, which can be a comera, a computer, a receiver, a video cassette player, or any device that can transmit a video signal. The video source 2 may generate of video signal from data received over a link 9, such as fiber optic cable. In addition, supply voltage is provided to the head mounted display 1 from a power supply 5, which can provide the required supply voltage through the video source 2. The video source 2 can also provide an audio signal. In a particular preferred embodiment of the invention, the video source 2 and the power supply 5 are physically connected to the head mounted display 1 using a connector 3.

It should be understood that the head mounted display 1 can be self-contained such that no physical connection to the remote video source 2 or power supply 5 is required. For example, the head mounted display 1 can contain a receiver to receive transmitted video information and translate that received video information to control signals. Such an embodiment is particularly useful for receiving an over-the-air television broadcast. Similarly, the power supply for the head mounted display 1 can be provided by batteries or another power source (e.g., solar cells) that are integrated into the head mounted display 1.

Figure 3:
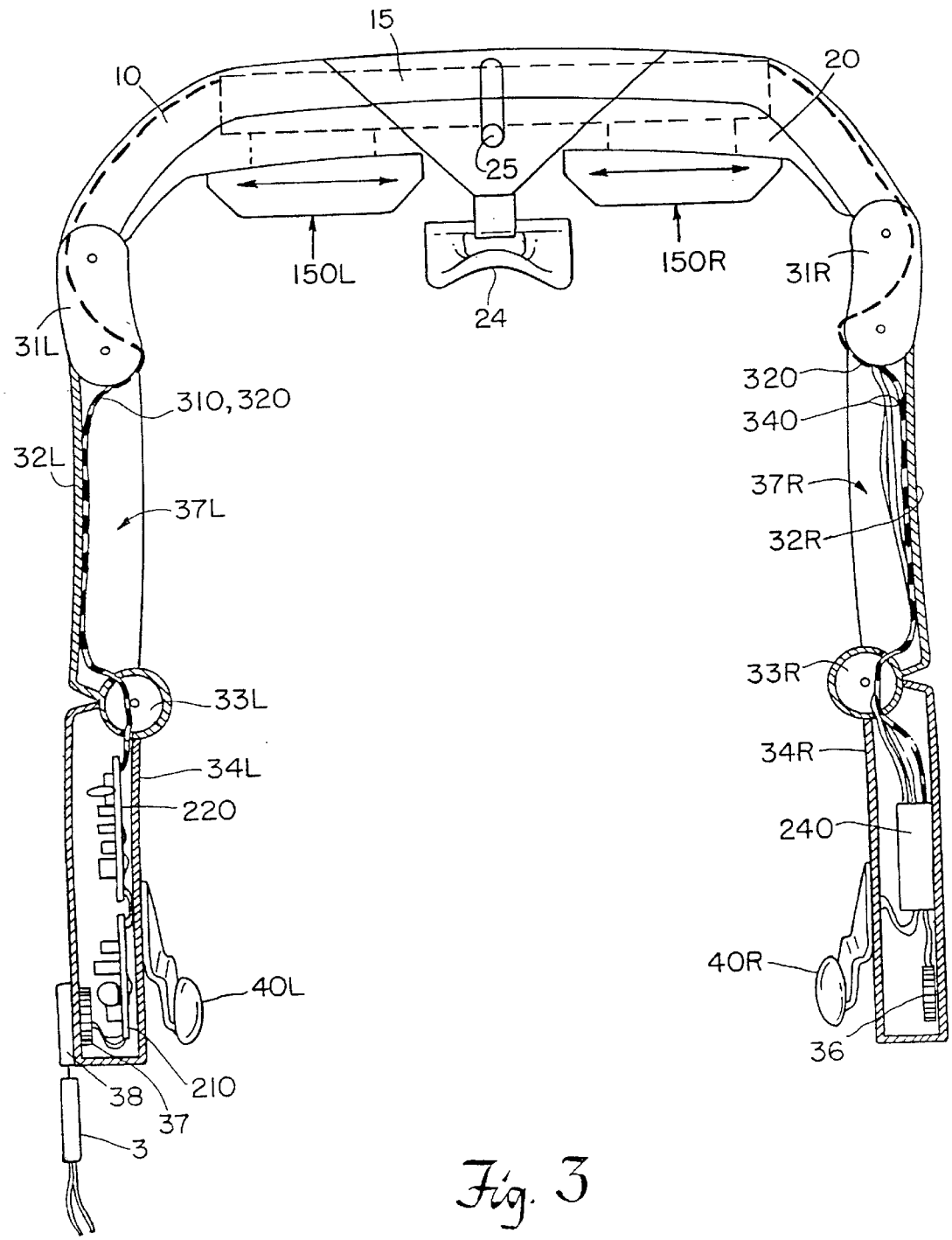
FIG. 3 is a top plan view of the preferred embodiment of FIG. 1 showing the placement of the wiring harness of FIG. 2.

The head mounted display 1 has a central housing body 12 that is formed from a front housing section 10 and a back housing section 20. The front section 10 is preferably formed from an opaque material such as plastic to block external light 99 from the user's eye's. The rear section 20 is also formed from an opaque material but is adapted to permit the user to adjust the optical assembly 100. The front section 10 is used to mount the optical assembly 100 (FIG. 3). In addition to the optical assembly 100, the user can also adjust a nose bridge assembly 24. The nose bridge assembly 24 can be positioned between an extended position (as illustrated) and a retracted position using an actuating button 25. The user can select a position from a discrete number of detents. In a preferred embodiment of the invention, the actuating button 25 is fastened to one end of a member that slides within a channel of a support member 15. The opposite end of the member is fastened to the nose bridge assembly 24. When in a selected position, the button is registered to a respective detent. The actuating button 25 is pushed to release the button 25 from the detent so that the nose bridge 24 is retracted.

Attached to each side of the head mounted display body 12 is a stem 30 through a respective forward hinge 31. Each stem contains a forward stem section 32, which is coupled to the forward hinge 31 at the proximal end. In a particular preferred embodiment, the forward stem section 32 contains a rear hinge 33 at the distal end and an earphone storage compartment 37 into which earphones 40 are stowed when the stems are folded.

Rearward stem sections 34 are coupled to the forward stem section 32 joints 33 at their proximal ends. The rearward stem sections 34 are adapted to supply earphones for use by the user. The earphones 40 pivot down from a horizontally aligned position for use by the user. When stowed, the earphones 40 are returned to a horizontally aligned position for storage in the earphone storage compartment 37 of the forward stem section 32. The earphones also slide forward and rearward for adjustment by the user. The rear stem sections 34 also contain control knobs 36, 37 (not shown) for adjusting the audio and video features during the operation of the head mounted display 1. The control knobs 36,37 are thus coupled to electronic circuitry, which is also stored within the stem sections 30. In a particular preferred embodiment of the invention, the right rear stem section 34R contains a volume control 36 and the left rear stem section 34L contains a contrast control 37 (not shown). Also in a particular preferred embodiment of the invention, the left rear stem section 34L contains a female connector 38 for interfacing with the video source 2 through the male connector 3. Alternatively, an antenna can be provided to receive audio and video signals.

The head mounted display 1 can be used in numerous and varied applications including, but not limited to, commercial audio/video presentations (television, home video), computer and multimedia presentations, hospital operating room use (e.g. orthoscopic surgery), remote camera monitoring, or any other use where private or detailed viewing of a video image is desired. For certain applications, it is desirable that the body 12 of the head mounted display 1 pivot upward like a visor to permit the user to easily alternate viewing the video image and alive scene. An example of such an application is when the head mounted display 1 is worn by a surgeon during orthoscopic, or other, surgery.

Figure 2:
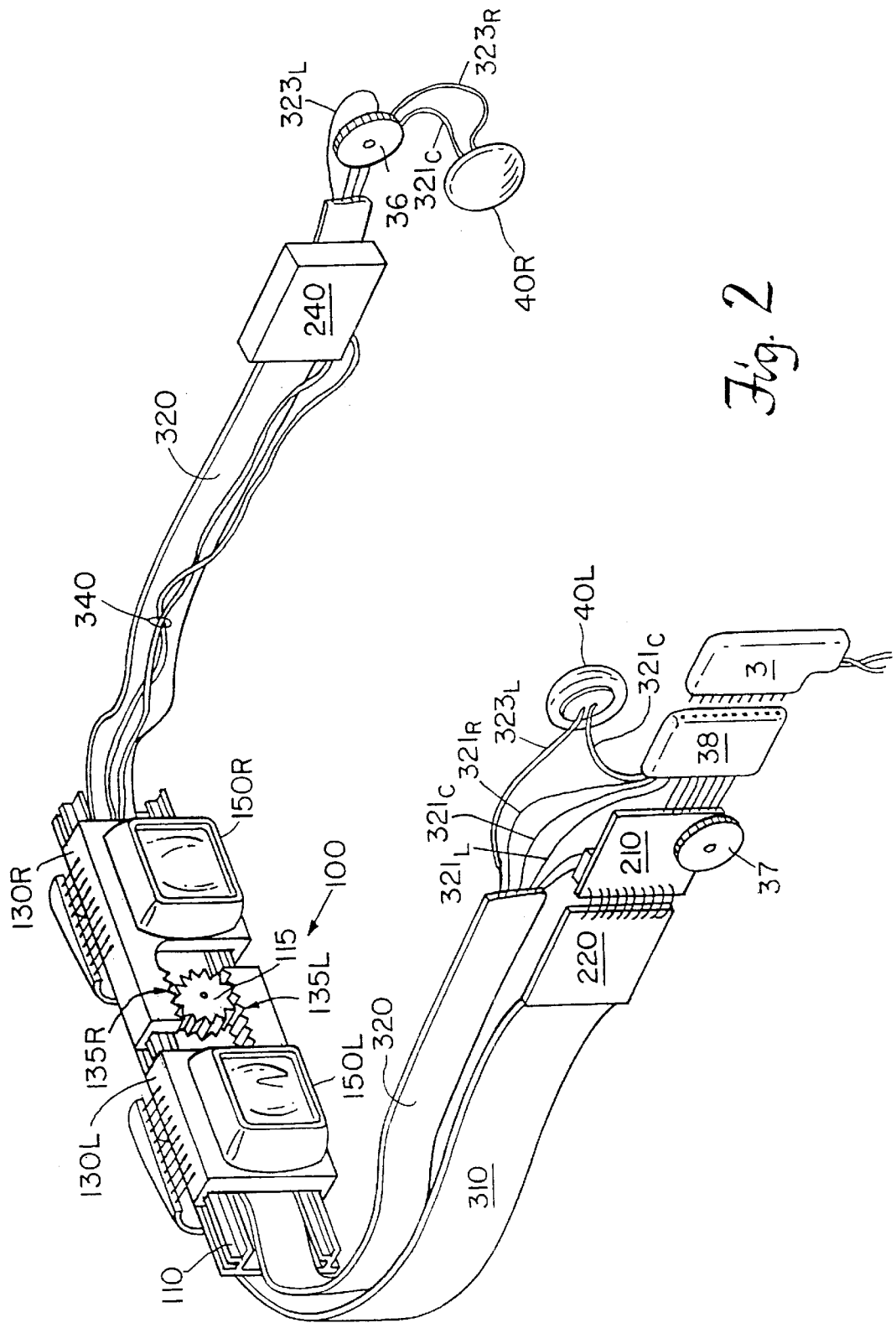
FIG. 2 is a perspective view of a preferred embodiment of a wiring harness.

FIG. 2 is a rear perspective illustration of the wiring harness enclosed by the head mounted display 1. In a particular preferred embodiment, audio and video information and supply power is provided via a 10-pin male connector 3. The male connector 3 registers to a 10-pin female connector 38. Of these ten pins, seven pins are provided for the display panel power and backlight power, and three pins are provided for audio signals. The seven video signals are provided to a first circuit 210. A contrast control 37 is coupled to the first circuit 210 to permit the user to adjust the contrast of the images displayed on the light valve display panels. In other preferred embodiments, other video controls (e.g., brightness, image alignment, color adjust, etc.) are provided and coupled to the first circuit 210. The first circuit 210 is coupled to a second circuit 220, which drives the light valve display panels via an N-conductor ribbon cable 310, where the number of conductors N is determined by the type of display panel.

The first circuit 210 also separates the backlight power signals from the light valve display panel signals and provides those signals to a backlight driver 240 over a 6-conductor ribbon cable 320. In addition to the two backlight driver signals, the 6-conductor ribbon cable 320 carries four audio signals. A left channel signal $321_L$, a common signal $321_c$, and a right channel signal $321_R$ are provided on the 6-conductor ribbon cable 320 to a stereo volume control 36. In a particular preferred embodiment, the backlight driver 240 and the stereo volume control 36 are disposed within the opposite stem 30 from the circuit 210.

The stereo volume control 36 permits the user to alter the gain of the signals in the right and left earphones 40. The adjusted right signal $321_R$ is provided to the right earphone 40R and the adjusted left channel signal $323_L$ is carried by the 6-conductor ribbon cable 320 back to the left earphone 40L. Both the left and right earphone are also provided with the common signal $321_c$. In other preferred embodiments, other audio controls (e.g., stereo balance, tone, etc.) are provided.

The second circuit 220 need not be a discrete device as illustrated; In another preferred embodiment, the second circuit 220 is fabricated with each display panel, such that each display panel is controlled by a respective control circuit.

The backlight driver 240 provides high voltage signals to the optical assembly 100 over signal lines 340. The high voltage signals can be used to drive a backlight for each display panel where a transmissive display panel is used. Similarly, the high voltage supply can be used to drive an emissive display panel. In a particular preferred embodiment of the invention, the display panels are of the active matrix liquid crystal display type, which require backlighting.

In a preferred embodiment the discrete circuiting 38, 210, 220, 240 are disposed near the rear of the head mounted display 1 to provide for more even weight distribution. A preferred control circuit for driving the active matrix display panel 13 is described in U.S. patent application Ser. No. 07/971,399, filed Nov. 4, 1992, the teachings of which are incorporated herein by reference. In another preferred embodiment, the display panels are of the passive matrix liquid crystal display type. A control circuit for driving the passive matrix display panel is described in U.S. patent application Ser. No. 07/971,326, filed Nov. 4, 1992, the teachings of which are incorporated herein by reference.

FIG. 3 is a top plan view of the head mounted display 1 taken along section line I—I of FIG. 1. The positioning of the wiring harness 300 is illustrated in phantom. Note that the ribbon cables 310, 320 are routed around the joints 31, 33 to permit folding of the stems 30 into a compact unit for storage. In a preferred embodiment, the rear hinge 33 employs a split cylinder that rotates independent of the joint so the ribbon cable is not visible when the stems are opened or folded.

Figure 4:
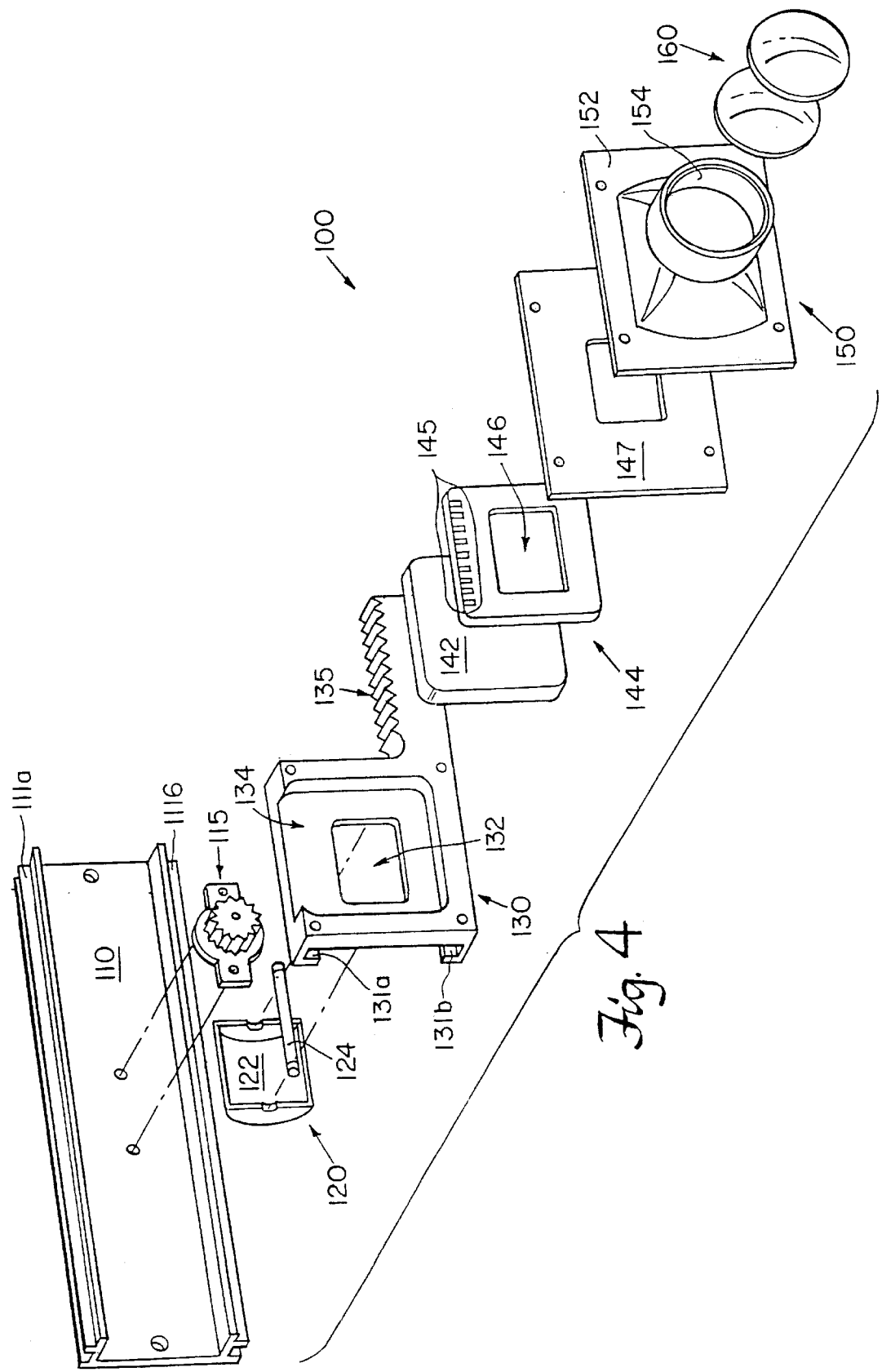
FIG. 4 is an exploded view of an optical assembly for use in a transmissive display system.

FIG. 4 is an exploded view of the optical assembly for the head mounted display 1. A mounting frame 110 is adapted to be mounted to the inner surface of the front section 10 of the head mounted display 1. The mounting frame 110 has first and second guide rails 111a, 111b to permit adjustment of the inter-pupil displacement of the light valve display panels. The adjustment of the inter-pupil displacement will be discussed in more detail below.

Mounted to the mounting frame is a backlighting assembly 120 for use in transmissive display systems. The backlighting assembly 120 contains a backlight 124, which is preferably a cold cathode backlight. The backlight 124 is disposed in a white reflector 122, which reflects light from the backlight 124 onto the display panel. In a transmissive color display, the backlighting can be provided by a multi-color sequential backlight where there is a backlight for each primary display color (e.g., red, green, blue) and the backlights are sequentially lit in timing with the switching of the light valve. In another preferred embodiment backlight is provided by direct ambient light 99. Through a light transmissive front housing section 10 and mounting frame 110.

A display holder 130 is positioned on the mounting frame 110 such that the mounting frame rails 111a, 111b are disposed within respective display holder channels 131a, 131b. The display holder 130 contains a display area 134 and an aperture 132 through which light from the backlight 124 passes. The display holder 130 also has a geared rack 135 for use in adjusting the inter-pupil displacement. A viscous damped gear assembly 115 meshes with the geared rack 135 such that rotational motion of the gear assembly 115 causes linear movement of the display holder 130 along the mounting frame 110. As illustrated, the user adjusts the inter-pupil displacement by sliding the left and right display holders 130 along the mounting frame 110. Alternatively, an axle can extend from the gate 115 to a knob or crank lever, preferably disposed on the forward face of the front section 10 of the display body 12. Indicator marking can also be provided to guide the user.

Although only the left portion of the optical assembly 100 is illustrated in FIG. 3, the right display holder is similar to the left display holder, except that the right display holder is rotated 180° relative to the left display holder. In that alignment, the left display holder gear rack 135L is positioned below the gear assembly 115 and the right display holder gear rack 135R is positioned above the gear assembly 115 as illustrated in FIG. 2. Consequently, the gear assembly simultaneously displaces both the left and right display holders when rotated. In a preferred embodiment of the invention, the inter-pupil displacement is adjustable by the user in a range from about 55 mm to 72 mm to provide an aligned left-right image to the user.

Returning to the optics assembly, a display assembly 140 is registered to the display chamber 134. The display assembly contains a translucent plastic light diffuser 142, a liquid crystal display panel 144, and a thin plastic matte black mask 146. The diffuser 142 diffuses light from the backlight 124 that passes through the display holder aperture 132 to provide a light distribution that is sufficiently uniform across the display area 147. The liquid crystal display panel 144 has a display area that is 0.7 inch as measured diagonally. The liquid crystal display panel 144 is preferably fabricated in accordance with U.S. patent Ser. No. 07/815,684, filed Dec. 31, 1991, the teachings of which are incorporated herein by reference. The display panel 144 contains connectors to connect to the 20-conductor ribbon cable 310 (FIG. 2). The display assembly 140 is secured in the display holder chamber 134 by an optics holder 150, which is fastened to the display holder 130. The optics holder 150 contains a housing 152 that may be conformable to the users eye to block ambient light and surround a cover glass 154.

Optional lenses 160 are adaptable to the display holder 150 to, for example, correct the user's near vision.

Figure 5:
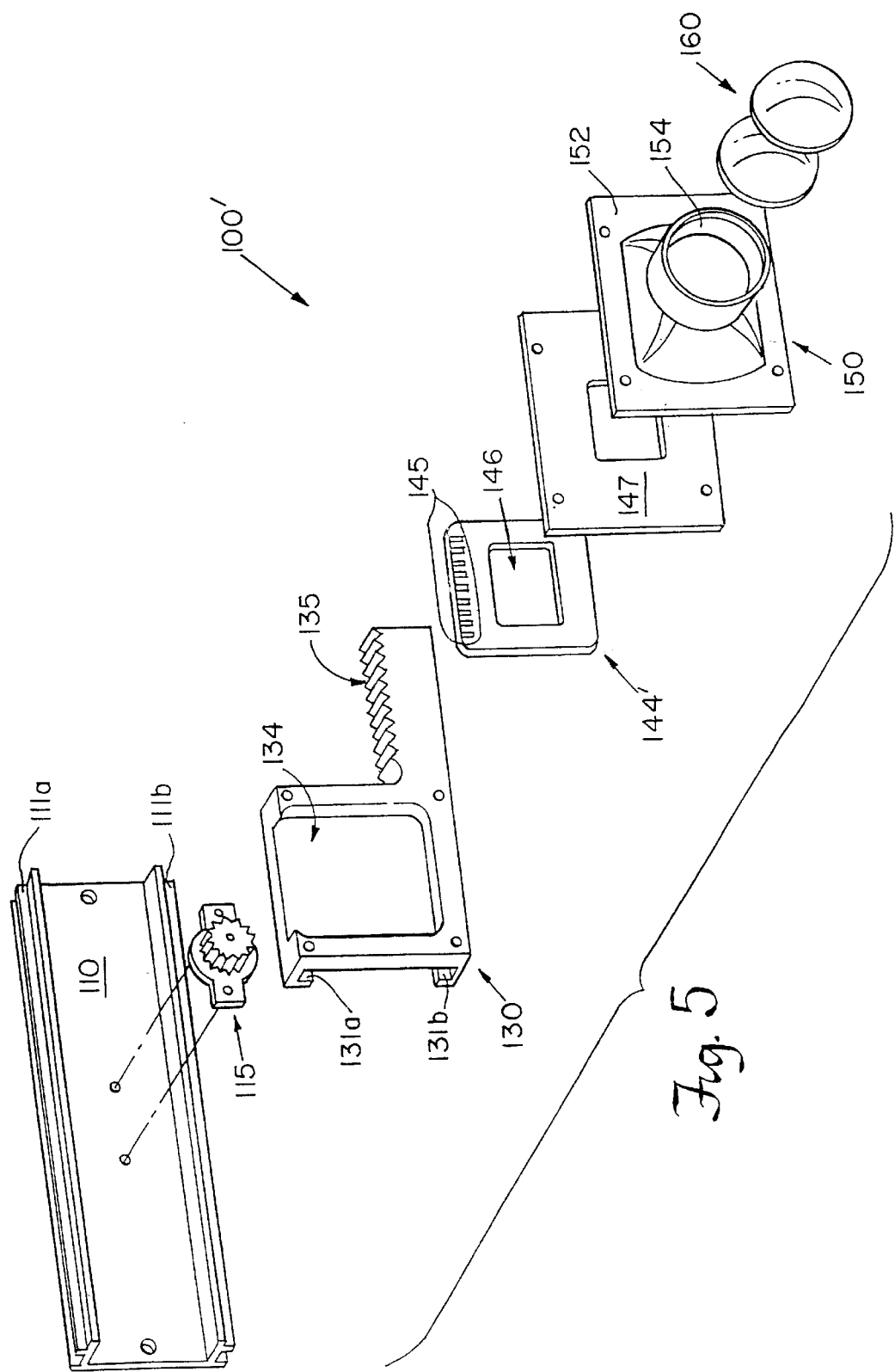
FIG. 5 is an exploded view of a preferred embodiment of an optical assembly for use in an emissive display system.

Although FIG. 4 illustrates a preferred embodiment employing a transmissive display panel, an optical assembly 100' can be adapted to receive an emissive display panel 144', as illustrated in FIG. 5. The emissive display optical assembly 100' differs from the transmissive display optical assembly 100 in the following respects. The emissive embodiment does not use a backlight 120. Thus the display holder 130 does not require an aperture 132 or a light diffuser 142. Instead, the light is provided by emissive material on the display panel 144 that is activated by drive signals. The emissive display panel is preferably fabricated in accordance with U.S. patent application Ser. No. 07/643,552, which issued on Apr. 5, 1994 as U.S. Pat. No. 5,360,788, the teachings of which are incorporated herein by reference.

FIG. 6 is a top plan view of the head mounted display 1 in the folded configuration. In particular, note that the nose bridge assembly 24 has been positioned into the retracted position for storage. In the retracted position, the nose bridge assembly 24 does not interfere with the folding of the stems 30. The hinge points 39 on the forward joints 31 are spring tensioned to facilitate head rotation.

FIG. 7 is an exploded view of a preferred spring cam assembly, 390R that is used at the hinge port 39R on the right forward joints 31R. The cam assembly 390R comprises a first cam 391R and a mirror image second cam 392R. The cams 391R, 392R contain an outer section 391Ra, 392Ra that registers to a respective receptacle on the body 12 and an inner section 391Rb, 392Rb that registers to a respective receptacle on the forward stem 32R. the inner cams 391Rb, 392Rb each include a landing 393 that allows for free play before engagement. A compression spring 395 is disposed between spring landings. The cams 391R, 392R compress the spring 395 when rotated together. For the right stem 30R, free play is exhibited for an angular displacement from the folded position, thereafter a variable return force is extended by the spring 395, which tends to secure the head mounted display 1 to the user's head. The compression can be adjusted by an adjustment bolt 396 that meshes with a threaded opening on the outer sections 391a, 392b.

FIGS. 8A–8B are partial views of another preferred stem storage embodiment. The forward stem section 32 is a skeleton frame on which the rear stem section 34 slides for storage. (FIG. 8B) Alternatively, the forward stem section 32' can encapsulate the rear stem section 34' when stored.

Other preferred embodiments employ other devices to secure the head mounted display, to the user's head. Such devices include an inflatable bladder 51 (shown in phantom in FIG. 1), with an associated pump assembly, that is disposed over the user's temple, and a headband 52, and ear loops 53.

In a preferred embodiment, the head mounted display 1 is formed from injection molded plastic. Particular components, such as the nose bridge support member 15, are rigid glass filtered molded plastic or a composite laminate.

Equivalents

Those skilled in the art will know, or be able to ascertain using no more than routine experimentation, many equivalents to the specific embodiments of the invention described herein. These and all other equivalents are intended to be encompassed by the following claims.

We claim:

1. A head mounted display device comprising;
   a housing for holding a first matrix display and a second matrix display relative to the head of a display user, the housing having a first aperture through which the first matrix display can be viewed and a second aperture through which the second matrix display can be viewed, each matrix display including a backlight source, a light diffuser, an active matrix liquid crystal display and a lens that are aligned along a common linear axis with an eye of a user, each backlight source directing light along each respective common linear axis through a respective diffuser, display and lens;
   a mounting frame within the housing such that each matrix display slides relative to the mounting frame to adjust a distance between the first matrix display and the second matrix display;
   a first pair of hinge mounted support elements that are both rotatable between respective closed positions and respective open positions such that the pair of support elements can be fitted about the head of the user when both support elements are in the respective open positions; and
   a connector mounted on the display device that is connected to the first matrix display and the second matrix display to deliver a video signal from an external video source.

2. The head mounted display device of claim 1 further comprising a second pair of hinge mounted support elements, each being mounted to one of the first pair of hinge mounted support elements.

3. The head mounted display device of claim 1 wherein the first matrix display and the second matrix display are connected to a driver circuit mounted to the housing.

4. The head mounted display device of claim 1 further comprising a spring tension mount which imparts a force tending to move each support element from the open position to the closed position.

5. The head mounted display device of claim 1 further comprising a pair of audio transducers wherein each audio transducer is moveably mounted in a support element.

6. The head mounted display device of claim 1 further comprising a moveable nose bridge mounted on the housing.

7. The head mounted display device of claim 1 wherein the first and second matrix displays have a diagonal display length of about 0.7 inches.

8. The head mounted display device of claim 1 further comprising a flexible sleeve for securing each support element to the user's ear.

9. The head mounted display device of claim 1 further comprising an optical system, the optical system having a first lens positioned between the first matrix display and the first aperture and a second lens positioned between the second matrix display and the second aperture.

10. The head mounted display of claim 1 further comprising a video control circuit mounted within the display device.

11. The head mounted display of claim 10, further comprising an adjustable controller mounted on the display device to adjust a control signal delivered by the video control circuit to the first and second matrix displays.

12. The head mounted display of claim 1 further comprising a display controller for adjusting a distance between the first matrix display and the second matrix display.

13. The head mounted display device of claim 1 further comprising a reflector mounted adjacent to each backlight source.

14. The head mounted display device of claim 1 wherein the backlight source is a multicolor light source.

15. The head mounted display device of claim 14 wherein the backlight source is sequentially operated to successively generate each color.

16. A head mounted display device comprising;
    a housing for holding a first matrix display and a second matrix display relative to the head of a display user, the first matrix display having a first backlight source directing light through a first light diffuser, the first display and a first lens along a first linear viewing axis to an eye of the user and the second matrix display having a second backlight source directing light through a second light diffuser, the second display and a second lens along a second linear viewing axis to an eye of the user;
    a first pair of hinge mounted support elements that are both rotatable between respective closed positions and respective open positions such that the pair of support elements can be fitted about the head of the user when both support elements are in the respective open positions;
    a mounting frame within the housing such that each matrix display slides relative to the mounting frame to adjust a distance between the first matrix display and the second matrix display;
    a pair of audio transducers, each audio transducer being mounted to one of the hinge mounted support elements such that each transducer can deliver an acoustic signal to an ear of the user; and
    a connector mounted on the display device that is connected to the first matrix display and the second matrix display to deliver a video signal from an external video source, the connector being connected to both audio transducers to deliver an audio signal from an external audio source.

17. The head mounted display device of claim 16 wherein the first matrix display and the second matrix display are both active matrix liquid crystal displays.

18. The head mounted display device of claim 16 further comprising a spring tension mount which imparts a force tending to move each support element from the open position against the head of the user.

19. The head mounted display device of claim 16 wherein each audio transducer is moveably mounted in a support element.

20. The head mounted display device of claim 16 further comprising an optical system, the optical system having a first lens positioned adjacent the first matrix display and a second lens positioned adjacent the second matrix display.

21. The head mounted display of claim 16 further comprising a video control circuit mounted within the display device.

22. The head mounted display of claim 21 further comprising a manually adjustable controller mounted on the display device to adjust a control signal delivered by the video control circuit to the first and second matrix displays.

23. The head mounted display of claim 16 further comprising a display controller for adjusting a distance between the first matrix display and the second matrix display.

24. The head mounted display device of claim 16 further comprising a control circuit for controlling the first and second backlight sources.

25. The head mounted display of claim 16 further comprising an audio control circuit mounted within the device and an audio controller to provide manual adjustment of the audio signal.

26. The head mounted display device of claim 16 wherein the backlight source is a multicolor light source.

27. The head mounted display device of claim 26 wherein the backlight source is sequentially operated to successively generate each color.

28. A head mounted display device comprising:
a mounting frame that is stationary relative to the head of a display user;
an active matrix liquid crystal display mounted to a display holder such that the display can be positioned with a lens, the display having a ribbon connector to a display circuit, a backlight source and a light diffuser along a single common linear optical axis extending through the lens to an eye of the user, the backlight source directing light along the common linear optical axis through the light diffuser, the display and the lens to the eye of the user; and
a rail on the mounting frame such that the display holder slides along the rail relative to the stationary frame in a direction transverse to the linear optical axis to laterally position the display relative to the eye of the user.

29. The head mounted display device of claim 28 further comprising an active matrix display driving circuit mounted to the frame.

30. The head mounted display device of claim 28 further comprising a backlight driver circuit mounted to the frame.

31. The head mounted display device of claim 28 further comprising a pair of audio transducers.

32. The head mounted display device of claim 28 wherein the backlight source is a multicolor light source.

33. The head mounted display device of claim 32 wherein the backlight source is sequentially operated to successively generate each color.

34. A head mounted display device comprising:
a mounting frame that is stationary relative to the head of a display user;
an active matrix liquid crystal display panel mounted to a display holder, the display panel having a ribbon connector to a display circuit;
a lens, a backlight source and a light diffuser positioned along a single common linear optical axis extending through the display panel to an eye of the user such that light from the backlight is directed through the light diffuser and the display to form an image that is directed through the lens along the common linear optical axis;
a rail on the mounting frame such that the display holder slides along the rail relative to the stationary frame in a direction transverse to the linear optical axis to position the display relative to the eye of the user; and
an active matrix display driving circuit mounted to the frame.

35. The head mounted display device of claim 34 further comprising a backlight driver circuit mounted to the housing.

36. The head mounted display device of claim 34 further comprising a flexible cable extending from the display holder to the frame to deliver video signals from a connector mounted to the frame to the matrix display.

37. The head mounted display device of 34 wherein the active matrix driving circuit is formed on the active matrix display panel.

38. The head mounted display device of claim 34 wherein the backlight source is a multicolor light source.

39. The head mounted display device of claim 38 wherein the backlight source is sequentially operated to successively generate each color.

40. A head mounted display device comprising:
a housing;
a matrix display carried by the housing and connected to a display circuit;
the housing having an aperture through which the matrix display can be viewed;
a receiver and an antenna for receiving a signal for displaying on the matrix display, the receiver being connected to the display circuit; and
the matrix display including a backlight source, a light diffuser, an active matrix liquid crystal display, and a lens that are aligned along a common linear axis extending to an eye of a user, the backlight source directing light along the common linear axis through the diffuser, the display and the lens.

41. A display device as in claim 40 further comprising a reflector mounted adjacent to the backlight source.

42. The display device as in claim 40 wherein the multicolor light source is red, blue, and green.

43. A display device as in claim 42 wherein the backlight source is sequentially operated to successively generate each color.

44. A method of displaying an image on a matrix display adapted for viewing by a user, comprising the following steps:
providing a housing for holding the matrix display, the housing having an aperture through which the matrix display can be viewed, the matrix display including a red, blue, and green backlight source, a light diffuser, an active matrix liquid crystal display and a lens that are aligned along a common linear axis;
receiving a video signal with a receiver and an antenna;
operating a display control circuit connected to the matrix display to display an image on the display;
simultaneously directing light from the backlight source along the common linear axis through the diffuser, display and lens by operating sequentially a multicolor light source to generate each color; and
aligning the common linear axis with an eye of the user.

* * * * *